United States Patent [19]

Wood

[11] 4,455,248

[45] Jun. 19, 1984

[54] ANTIFREEZE COMPOSITIONS

[75] Inventor: Donald L. Wood, Houston, Tex.

[73] Assignee: Shell Oil Company, Houston, Tex.

[21] Appl. No.: 546,081

[22] Filed: Oct. 31, 1983

Related U.S. Application Data

[63] Continuation of Ser. No. 383,888, Jun. 1, 1982, abandoned.

[51] Int. Cl.$^3$ .......................... C09K 5/00; F28F 23/02
[52] U.S. Cl. ...................................... 252/75; 252/74; 252/77; 252/389 A
[58] Field of Search ................... 252/74, 75, 77, 389 A

[56] References Cited

U.S. PATENT DOCUMENTS

| | | | |
|---|---|---|---|
| 2,524,484 | 10/1950 | Smith | 252/75 |
| 2,693,451 | 11/1954 | Heisig | 252/75 |
| 3,445,395 | 5/1969 | Boehmer | 252/75 |
| 4,149,985 | 4/1979 | Wilson | 252/75 |
| 4,242,214 | 12/1980 | Lambert, Jr. | 252/75 |
| 4,382,870 | 5/1983 | Abel et al. | 252/75 |

*Primary Examiner*—John E. Kittle
*Assistant Examiner*—Robert A. Wax

[57] ABSTRACT

A single-phase glycol-based antifreeze composition having superior performance in multi-metal corrosion protection contains certain silicate, phosphate, borate, nitrate, azole, and alkali compounds in specified proportions. Such compositions are of particular advantage in inhibiting the corrosion of aluminum surfaces at elevated antifreeze service temperatures.

16 Claims, No Drawings

ANTIFREEZE COMPOSITIONS

This is a continuation of application Ser. No. 383,888, filed June 1, 1982, now abandoned.

BACKGROUND OF THE INVENTION

The present invention relates to glycol-based antifreeze compositions, particularly to corrosion-inhibiting compositions useful in automotive service.

Current progress in automotive technology is leading to the development of more efficient, smaller, lighter cars. In one aspect, this progress has resulted in the increased use of aluminum in engine cylinder heads and in components of the engine cooling system such as radiator cores and water pump housings and fittings. In another aspect, this progress gas resulted in engines designed to operate at higher temperatures. Overall, these and other factors have recently placed more stringent demands upon the performance of the aqueous glycol-based "antifreeze" solutions employed as engine coolants. Antifreeze formulations must not only prevent the automotive engine cooling system from freezing and protect against overheating but must also provide corrosion protection of cooling system surfaces with which it is in contact. Conventional antifreezes which have been formulated with corrosion inhibitors satisfactory for protection of engines having cast iron, steel, solder, copper and brass component surfaces are generally not suitable in preventing the corrosion of aluminum and its alloys. This is particularly true under increased operating temperatures. In the cooling system, aluminum corrosion products, particularly aluminum oxide, typically circulate to and deposit on internal radiator surfaces interfering with the heat transfer necessary to keep the engine from overheating.

Of course, various corrosion inhibitors, particularly silicate compounds, are known as components of antifreeze formulations which aid in protecting aluminum. It has, however, been found difficult to formulate such aluminum corrosion inhibitors into a produce which satisfies all of the criteria of antifreeze service. For instance, the silicates are often unstable, particularly in combination with inhibitors necessary for protection of other metals. Instability, as evidenced, for example, by precipitate formation or by loss of corrosion inhibiting activity, may be a problem in terms of shelf life of an antifreeze concentrate or in terms of use life in aqueous solutions under service conditions in the cooling system. In service, the inhibitors must remain stable in the presence of contaminants, such as decomposition products of the glycol upon which the antifreeze is based and substances such as carbon dioxide and exhaust gases which leak into the cooling system, and must remain capable of counteracting the corrosive tendencies of these contaminants. Although stable and otherwise compatible inhibitor combinations have been developed, they are, as a rule, either unduly expensive, or objectionable from the standpoint of toxicology and environmental concerns, or unable to provide fully satisfactory multi-metal corrosion protection, or characterized by unacceptable physical properties.

With regard to features of the invention relating to antifreeze compositions containing certain specified corrosion-inhibiting ingredients, particularly phosphate and silicate compounds, it is generally true that each such ingredient is known to the art for antifreeze service. The present invention, however, is directed to a particular combination of specific ingredients in specific proportions in a novel antifreeze composition which satisfies the needs of the progressing automotive technology. The composition has a relatively high measure of stability in service and provides unexpectedly superior protection of both aluminum and other metals under high temperature service conditions. Of particular importance to the invention is a glycol based composition combining both a moderate amount of silicate component with a relatively large amount of phosphate component. Known antifreezes comprising large proportions of phosphate do not have satisfactory performance with respect to multi-metal corrosion protection. It has been suggested (U.S. Pat. No. 4,242,214) that the presence of the phosphate ion in antifreeze composition is a cause of the corrosion of aluminum surfaces. Moreover, known antifreezes comprising both phosphate and silicate components (e.g., those disclosed in U.S. Pat. No. 4,210,549 and U.S. Pat. No. 3,121,692) do not contain the high level of phosphate found to be critical in the composition of the invention for aluminum protection at high temperature.

SUMMARY OF THE INVENTION

Accordingly, the present invention is a single-phase glycol-based antifreeze composition characterized by excellent stability and multi-metal corrosion protection at elevated temperatures, which comprises one or more glycols selected from the group consisting of ethylene glycol, diethylene glycol, triethylene glycol, propylene glycol and glycerol and additionally comprising for every 100 parts by weight of said alcohol: (a) between about 0.1 and 500 parts by weight water, (b) between about 0.05 and 0.30 parts by weight of sodium metasilicate, (c) between 1.2 and about 4.0 parts by weight of a phosphate of potassium, (d) between about 0.15 and 0.50 parts by weight of a compound selected from the group consisting of sodium metaborate and sodium tetraborate, (e) between about 0.10 and 0.40 parts by weight of sodium nitrate, (f) an effective copper corrosion inhibiting amount of a compound selected from the group consisting of tolyltriazole, benzotriazole, and mercaptobenzothiazole, and (g) a quantity of alkali sufficient to provide a pH for the composition of between about 9 and 11.5.

DESCRIPTION OF THE PREFERRED EMBODIMENTS

The present invention most particularly relates to a specific combination of corrosion inhibitors for glycol-based antifreezes which provides protection of aluminum from corrosion under high temperature service conditions without sacrificing the corrosion protection of other metals or the other properties required of suitable antifreeze formulations.

The corrosion inhibitor combination is useful in antifreeze formulations based on glycols, which, of course, impart to aqueous solutions the desired freezing point depression and boiling point elevation. Glycols suitable for purposes of the invention generally include those commonly applied in conventional antifreeze compositions and specifically include the lower alkylene glycols, such as ethylene glycol and propylene glycol, the polyalkylene glycol, such as diethylene glycol, triethylene glycol, and dipropylene glycol, and polyhydroxy compounds, such as glycerol. Mixtures of such glycols are equally suitable. The alkylene glycols and polyalkylene glycols are preferred, particularly ethylene glycol, diethylene glycol and propylene glycol. Most preferred is ethylene glycol, which, as it is typically commercially available, contains up to about 10 percent by weight of other glycols.

The composition of the invention optionally contains water. For reasons relating to convenience in handling and storage, the antifreeze may be formulated as a concentrate containing little or no water. Typically, such concentrates contain between about 0.1 and 10 parts by weight of water per 100 parts by weight of glycol, while a water content of between about 1 and 5 parts by weight per 100 parts by weight of glycol is particularly preferred. The invention is, however, intended to encompass both such concentrates and dilutions made with water for use in the automotive cooling system and other heat transfer services. For the typical service, the concentrate is diluted to a solution containing up to about 400 parts by weight of water per 100 parts by weight of glycol, preferably about 40 to 200 parts by weight of water per 100 parts by weight of glycol, and most preferably about 65 to 150 parts by weight of water per 100 parts by weight of glycol. The relative amount of water and glycol in such service solutions is, of course, varied to provide the desired combination of heat transfer, freezing point and boiling point properties, and corrosion protection.

The composition of the invention necessarily contains sodium metasilicate in a quantity suitably between about 0.05 and 0.30 parts by weight per 100 parts by weight of glycol, preferably between about 0.06 and 0.25 parts by weight per 100 parts by weight of glycol, more preferably between about 0.07 and 0.20 parts by weight per 100 parts by weight of glycol, and most preferably about 0.10 parts by weight per 100 parts by weight of glycol. The hydrate form of the sodium metasilicate may be utilized in formulating the composition, in which case the quantities indicated are exclusive of the water of hydration. In the present invention, the use of the silicate provides benefit in aluminum corrosion protection, without suffering disadvantages of instability recognized in the art.

A combination of the specified silicate compound and a phosphate compound is primarily responsible for the hot aluminum surface corrosion protection provided by the invention. The phosphate also aids in preventing cavitation erosion of aluminum pump parts.

A phosphate of potassium is necessary for purposes of the invention. Other phosphates suitable for antifreeze service do not possess the solubility characteristics required in this composition. Furthermore, observation has been made of a performance advantage, in corrosion protection, associated with the potassium ion. Although any of the known phosphate salts of potassium are suitable, dipotassium phosphate ($K_2HPO_4$) is particularly preferred.

The concentration at which the phosphate is applied is necessarily at least 1.2 parts by weight, and preferably less than about 4.0 parts by weight, per 100 parts by weight of glycol. Lower concentrations, e.g., one percent by weight on glycol or less, as have been known in compositions of the art appear to function by a different mechanism than the higher concentrations now specified and, in any event, do not provide an acceptable level of aluminum protection in the presence of other components of this invention. Quantities between about 1.3 and 3.0 parts by weight per 100 parts by weight of glycol are particularly preferred, while those between about 1.4 and 2.5 parts by weight per 100 parts by weight of glycol are considered more preferred, and those between about 1.6 and 2.2 parts by weight per 100 parts by weight of glycol are considered most preferred. Again, the hydrate forms of the phosphates may be employed, in which case the quantities indicated are exclusive of the water of hydration.

The composition of the invention also necessarily contains a borate compound, preferably either sodium metaborate or sodium tetraborate, in a quantity sufficient to provide protection against corrosion of iron-containing materials. The level of borate must, however, be limited in the interests of aluminum protection. A concentration of the borate compound between about 0.15 and 0.50 parts by weight (exclusive of any water of hydration) per 100 parts by weight of glycol is generally suitable, while a concentration between about 0.20 and 0.45 parts by weight per 100 parts by weight glycol is preferred and a concentration between about 0.25 and 0.40 parts by weight per 100 parts by weight of glycol is more preferred. About 0.30 to 0.35 parts by weight sodium tetraborate (particularly about 0.50 parts by weight sodium tetraborate pentahydrate, inclusive of water of hydration) is most preferred.

Sodium nitrate is also necessarily present in the composition of the invention in an amount between about 0.10 and 0.40 parts by weight per 100 parts by weight of glycol. The nitrate concentration is preferably between about 0.15 and 0.30, most preferably between about 0.20 and 0.25, parts by weight per 100 parts by weight of glycol.

In order to protect against corrosion of brass and copper, the antifreeze of the invention necessarily contains an effective amount of at least one compound selected from the group consisting of tolyltriazole, benzotriazole, and sodium mercaptobenzothiazole. For the tolyltriazole or benzotriazole, such an effective amount is suitably at least about 0.05, preferably between about 0.07 and 0.20, and most preferably about 0.10 parts by weight per 100 parts by weight of glycol. For the mercaptobenzothiazole, an effective amount is at least about 0.10, preferably between about 0.15 and 0.50, and most preferably about 0.28 parts by weight per 100 parts by weight of glycol.

The application in the invention of tolyltriazole is particularly preferred.

The pH of the composition of the invention, whether an antifreeze concentrate or a diluted service solution, must also be controlled for purposes of corrosion protection. As prepared, the antifreeze should generally have a pH in the range from about 9 to 11.5, measured, for example, on a sample diluted with 100 to 900 parts by volume water per 100 parts by volume of antifreeze and determined with a standardized pH meter according to ASTM method D 1287. (In service, pH often decreases from such a level to about 8 to 9.) A pH between about 9.5 and 11 is preferred, while a pH between about 10 and 10.8 is considered most preferred. To provide the desired pH level, it is generally necessary to add to the composition any of the alkali known to be suitable for antifreeze services, preferably one or a mixture of the alkali metal hydroxides, more preferably sodium or potassium hydroxide, and most preferably sodium hydroxide in a quantity, for instance, of about 0.12 parts by weight per 100 parts by weight of alcohol.

If desired, the antifreeze composition of the invention may contain small amounts of further, optional ingredients, compatible with those hereinabove specified, which are designed to impart special properties. For illustration, mention may be made of dyes, anti-foam agents, additional corrosion inhibitors, alcohol oxidation inhibitors, and sealants. In some cases, such ingredients may be responsible for the presence of a second phase in the otherwise single-phase solution of the composition of the invention.

EXAMPLE 1

An antifreeze concentrate in accordance with the invention was formulated to a composition of about 93.8% w ethylene glycol, 3.2% w water, 0.16% w sodium metasilicate pentahydrate, 1.90% w dipotassium phosphate, 0.50% w borax pentahydrate, 0.25% w sodium nitrate, 0.10% w tolyltriazole, and 0.13% w sodium hydroxide.

Multi-metal corrosion protection of the formulation was evaluated in the standard Glassware Corrosion Test ASTM D 1384. Results of the performance of the antifreeze concentrate, after dilution in one case to 33% volume concentrate in water and in another case to 25% volume concentrate in water, are presented in Table I. Also shown in this Table, for comparison, are generally recognized standards for maximum acceptable level of corrosion with a 33% volume solution of concentrate in water. Entries in the table are in terms of milligrams per square inch of metal surface lost during a 14 day test at 88° C., and represent average results for four tests.

TABLE I

| | % volume dilution | copper | solder | brass | carbon steel | cast iron | aluminum |
|---|---|---|---|---|---|---|---|
| formulation according to invention | 33 | 0.2 | 0.5 | 0.6 | 0.8 | 0.3 | 0.0 |
| | 25 | 0.1 | 0.8 | 0.1 | 0.2 | 1.7 | 2.0 |
| standard | 33 | 2 | 4 | 2 | 2 | 2 | 5 |

EXAMPLE 2

A 25% volume dilution of the antifreeze concentrate (in accordance with the invention) described in Example 1 was evaluated in a "hot surface aluminum" corrosion test for performance in protecting against the corrosion of aluminum at elevated temperature. Under the standard test procedures of Wiggle et al (SAE 810038), the corrosion of aluminum coupon surfaces in the 25% volume solution of the concentrate in water was determined in a 7 day test at 135° C.

As a result of this test, aluminum corrosion was determined for the formulation in accordance with the invention at a level of 0.3 milligrams per square centimeter of aluminum coupon surface. This level compares favorably to a generally recognized standard for maximum acceptable corrosion in the hot surface aluminum test of 1.0 milligrams per square centimeter.

During the test, pH of the antifreeze solution dropped from about 10.0 to 8.7, while reserve alkalinity maintained about 92% of its initial value. Following the test, the antifreeze solution was observed to be clear and the coupon surface to be clean, i.e., without noticeable deposit or discoloration.

EXAMPLE 3

A second antifreeze concentrate, in accordance with the invention, was formulated as described in Example 1, but in this case having 1.4% w dipotassium phosphate (and 94.0% w ethylene glycol).

A third concentrate, not in accordance with the invention was also formulated as described in Example 1, but in this case having only 1.0% w dipotassium phosphate (and 94.4% w ethylene glycol).

The critical influence of the dipotassium phosphate ($K_2HPO_4$) concentration level upon aluminum corrosion protection of the overall composition is illustrated by comparison of hot surface aluminum tests conducted with the three formulations. With regard to aluminum corrosion, the test of the 1.4% w $K_2HPO_4$ formulation resulted in a slight gain in coupon weight of 0.2 mg/cm$^2$, which compares favorably with the 0.3 mg/cm$^2$ loss shown in Example 2 for the test of the 1.9% w $K_2HPO_4$ formulation and the standard of 1.0 mg/cm$^2$. The formulation containing only 1.0%w $K_2HPO_4$, however, was tested with an unacceptable weight loss of 13.5 mg/cm$^2$. With both the 1.9% w and 1.4% $K_2HPO_4$ formulations the antifreeze solution was clear and the coupon surface clear at the conclusion of the test. Following the test of the 1.0% w $K_2HPO_4$ formulation, the solution showed a white precipitate and the coupon surface was black.

EXAMPLE 4

The stability of the antifreeze formulation described in Example 1 and its continued performance with respect to corrosion inhibition in automotive cooling systems were evaluted under typical service conditions in ten 1981 model automobiles, seven of which had aluminum cylinder heads. The cooling system of each of the test cars was charged with a 40–50% volume mixture of the antifreeze concentrate in water. During the tests, the individual automobiles were operated between approximately 3 to 6 months, attaining between about 10,000 and 40,000 service miles. Radiator samples following the test were clear to slightly hazy with no precipitation, no solids, and no visual indication of inhibitor breakdown or corrosion products.

The pH of the antifreeze declined early in the service tests from about 10 to about 8.5 to 9 but maintained the lower level thereafter. Buffer capacity remained excellent—reserve alkalinity averaged 94% of the original value after 10,000 to 15,000 miles, 90% after 20,000–25,000 miles and 84% after 35,000 miles.

Silicate content in solution in the antifreeze was found to maintain a level of about 50% of original in the automobiles reaching 20,000 to 35,000 miles. The aluminum content of radiator antifreeze samples after 35,000 miles was less than 4 parts per million (ppm), no more than the level found in fresh radiator samples subjected to very few miles of service. The levels of iron and lead in radiator samples at the end of the test were generally less than 5 ppm, while copper levels normally averaged less than 10 ppm.

I claim as my invention:

1. A single-phase glycol antifreeze composition which comprises one or more glycols selected from the group consisting of ethylene glycol, diethylene glycol, triethylene glycol, propylene glycol and glycerol and additionally comprising for every 100 parts by weight of said glycol: (a) between about 0.1 and 500 parts by weight water, about 0.10 parts by weight of sodium metasilicate, (b) between about 1.6 and 2.2 parts by weight of a phosphate of potassium, (c) between about 0.15 and 0.50 parts by weight of a compound selected from the group consisting of sodium metaborate and sodium tetraborate, (d) between about 0.10 and 0.40 parts by weight of sodium nitrate, (e) an effective copper corrosion inhibiting amount of a compound selected from the group consisting of tolyltriazole, benzotriazole, and mercaptobenzothiazole, and (f) a quantity of alkali sufficient to provide a pH for the composition of between about 9 and 11.5.

2. The composition in accordance with claim 1, comprising for every 100 parts by weight of glycol between about 1 and 400 parts by weight of water, about 0.10 parts by weight of sodium metasilicate, between about 1.6 and 2.2 parts by weight of a phosphate of potassium, between about 0.20 and 0.45 parts by weight of sodium metaborate or sodium tetraborate, between about 0.15 and 0.30 parts by weight of sodium nitrate, and a quantity of alkali sufficient to provide pH for the composition of between about 9.5 and 11.

3. The composition in accordance with claim 2, comprising for every 100 parts by weight of glycol between about 1 and 300 parts by weight of water, about 0.10 parts by weight of sodium metasilicate, between about 1.6 and 2.2 parts by weight of a phosphate of potassium, between about 0.25 and 0.40 parts by weight of sodium metaborate or sodium tetraborate, and between about 0.20 and 0.25 parts by weight of sodium nitrate.

4. The composition in accordance with claim 3, comprising for every 100 parts by weight of glycol, between about 0.07 and 0.20 parts by weight of tolyltriazole or benzotriazole.

5. The composition in accordance with claim 3, comprising for every 100 parts by weight of glycol, between about 0.15 and 0.50 parts by weight of mercaptobenzothiazole.

6. A single-phase glycol-based antifreeze concentrate which comprises for every 100 parts by weight of ethylene glycol, between 1 and 5 parts by weight of water, about 0.10 parts by weight of sodium metasilicate, between about 1.6 and 2.2 parts by weight of a phosphate of potassium, between about 0.30 and 0.35 parts by weight of sodium metaborate or sodium tetraborate, between about 0.20 and 0.25 parts by weight of sodium nitrate, and effective copper corrosion inhibiting amount of a compound selected from the group consisting of tolyltriazole, benzotriazole, and mercaptobenzothiazole, and a quantity of alkali sufficient to provide a pH for the composition of between about 10 and 10.8.

7. The composition in accordance with claim 6, comprising for every 100 parts by weight of glycol between about 0.07 and 0.20 parts by weight of tolyltriazole or benzotriazole.

8. The composition in accordance with claim 6, comprising for every 100 parts by weight of glycol, between about 0.15 and 0.50 parts by weight of mercaptobenzothiazole.

9. The composition in accordance with claim 1, wherein the phosphate of potassium is dipotassium phosphate.

10. The composition in accordance with claim 2, wherein the phosphate of potassium is dipotassium phosphate.

11. The composition in accordance with claim 3, wherein the phosphate of potassium is dipotassium phosphate.

12. The composition in accordance with claim 4, wherein the phosphate of potassium is dipotassium phosphate.

13. The composition in accordance with claim 5, wherein the phosphate of potassium is dipotassium phosphate.

14. The composition in accordance with claim 6, wherein the phosphate of potassium is dipotassium phosphate.

15. The composition in accordance with claim 7, wherein the phosphate of potassium is dipotassium phosphate.

16. The composition in accordance with claim 8, wherein the phosphate of potassium is dipotassium phosphate.

* * * * *